(12) United States Patent
Weaver (10) Patent No.: US 9,384,901 B2
(45) Date of Patent: Jul. 5, 2016

(54) WET ELECTROLYTIC CAPACITOR FOR USE AT HIGH TEMPERATURES

(71) Applicant: AVX Corporation, Fountain Inn, SC (US)

(72) Inventor: Mitchell D. Weaver, Simpsonville, SC (US)

(73) Assignee: AVX Corporation, Fountain Inn, SC (US)

(*) Notice: Subject to any disclaimer, the term of this patent is extended or adjusted under 35 U.S.C. 154(b) by 193 days.

(21) Appl. No.: 14/210,620

(22) Filed: Mar. 14, 2014

(65) Prior Publication Data

US 2014/0268498 A1 Sep. 18, 2014

Related U.S. Application Data

(60) Provisional application No. 61/788,263, filed on Mar. 15, 2013.

(51) Int. Cl.
| | |
|---|---|
| *H01G 9/08* | (2006.01) |
| *H01G 9/10* | (2006.01) |
| *H01G 9/042* | (2006.01) |
| *H01G 9/008* | (2006.01) |
| *H01G 9/06* | (2006.01) |

(Continued)

(52) U.S. Cl.
CPC .............. *H01G 9/10* (2013.01); *H01G 9/008* (2013.01); *H01G 9/042* (2013.01); *H01G 9/0425* (2013.01); *H01G 9/06* (2013.01); *B82Y 30/00* (2013.01); *B82Y 99/00* (2013.01); *H01G 9/0032* (2013.01); *H01G 9/052* (2013.01); *H01G 9/145* (2013.01); *H01G 11/78* (2013.01); *Y10S 977/948* (2013.01)

(58) Field of Classification Search
None
See application file for complete search history.

(56) References Cited

U.S. PATENT DOCUMENTS

| | | |
|---|---|---|
| 2,628,271 A | 2/1953 | Brafman |
| 4,017,302 A | 4/1977 | Bates et al. |

(Continued)

FOREIGN PATENT DOCUMENTS

| | | |
|---|---|---|
| GB | 2 248 526 A | 4/1992 |
| GB | 2 435 960 A | 9/2007 |

(Continued)

OTHER PUBLICATIONS

Product Information on DuPont™ Kalrez® Perfluoroelastomer Parts, 2014, 2 page.

(Continued)

*Primary Examiner* — Dion R Ferguson
(74) *Attorney, Agent, or Firm* — Dority & Manning, P.A.

(57) ABSTRACT

A wet electrolytic capacitor that contains an anode formed from an anodically oxidized sintered porous body and a fluidic working electrolyte is provided. The casing contains a metal substrate coated an electrochemically-active material. Through a unique and controlled combination of features relating to the capacitor configuration and sealing assembly, the present inventor has discovered that good electrical properties (e.g., ESR stability) can be achieved at relatively high temperatures. One unique feature of the wet electrolytic capacitor that can help achieve such good ESR stability is the presence of a dielectric layer on the metal substrate of the cathode within a controlled thickness range. In other embodiments, a sealing assembly may be employed that contains a hermetic seal (e.g., glass-to-metal seal) and an elastomeric barrier seal formed from a high-temperature elastomeric material.

18 Claims, 2 Drawing Sheets

(51) Int. Cl.
*H01G 11/78* (2013.01)
*B82Y 99/00* (2011.01)
*H01G 9/052* (2006.01)
*H01G 9/00* (2006.01)
*H01G 9/145* (2006.01)
*B82Y 30/00* (2011.01)

(56) References Cited

U.S. PATENT DOCUMENTS

| | | | |
|---|---|---|---|
| 4,025,827 A | 5/1977 | Pellerin et al. | |
| 4,035,905 A | 7/1977 | Clement | |
| 4,281,092 A | 7/1981 | Breazeale | |
| 4,483,819 A | 11/1984 | Albrecht et al. | |
| 4,555,268 A | 11/1985 | Getz | |
| 4,780,797 A | 10/1988 | Libby | |
| 4,942,500 A | 7/1990 | Libby et al. | |
| 4,992,910 A | 2/1991 | Evans | |
| 5,043,849 A | 8/1991 | Libby | |
| 5,082,491 A | 1/1992 | Rerat | |
| 5,098,485 A | 3/1992 | Evans | |
| 5,137,771 A | 8/1992 | Lofe et al. | |
| 5,369,547 A | 11/1994 | Evans | |
| 5,400,211 A | 3/1995 | Evans | |
| 5,469,325 A | 11/1995 | Evans | |
| 5,559,667 A | 9/1996 | Evans | |
| 5,716,511 A | 2/1998 | Melody et al. | |
| 5,737,181 A | 4/1998 | Evans | |
| 5,754,394 A | 5/1998 | Evans et al. | |
| 5,786,980 A | 7/1998 | Evans | |
| 5,788,216 A | 8/1998 | Pittman et al. | |
| 5,894,403 A | 4/1999 | Shah et al. | |
| 5,926,362 A | 7/1999 | Muffoletto et al. | |
| 5,954,856 A | 9/1999 | Pathare et al. | |
| 5,982,609 A | 11/1999 | Evans | |
| 6,094,339 A | 7/2000 | Evans | |
| 6,162,345 A | 12/2000 | Kinard et al. | |
| 6,219,222 B1 | 4/2001 | Shah et al. | |
| 6,231,993 B1 | 5/2001 | Stephenson et al. | |
| 6,238,456 B1 | 5/2001 | Wolf et al. | |
| 6,346,185 B1 | 2/2002 | Kinard et al. | |
| 6,576,038 B1 | 6/2003 | Rao | |
| 6,576,524 B1 | 6/2003 | Evans et al. | |
| 6,594,140 B1 | 7/2003 | Evans et al. | |
| 6,659,283 B1 | 12/2003 | Muffoletto et al. | |
| 6,687,117 B2 | 2/2004 | Liu et al. | |
| 6,707,660 B1 | 3/2004 | Evans et al. | |
| 6,721,169 B2 | 4/2004 | Melody et al. | |
| 6,721,170 B1 | 4/2004 | Evans et al. | |
| 6,740,420 B2 | 5/2004 | Muffoletto et al. | |
| 6,802,951 B2 | 10/2004 | Hossick-Schott | |
| 6,965,510 B1 | 11/2005 | Liu et al. | |
| 7,002,790 B2 | 2/2006 | Hossick-Schott et al. | |
| 7,038,901 B2 | 5/2006 | Muffoletto et al. | |
| 7,116,548 B2 | 10/2006 | Satterfield, Jr. et al. | |
| 7,206,186 B1 | 4/2007 | Knight et al. | |
| 7,224,576 B2 | 5/2007 | Hossick-Schott | |
| 7,256,982 B2 | 8/2007 | Lessner et al. | |
| 7,271,994 B2 | 9/2007 | Stemen et al. | |
| 7,314,685 B2 | 1/2008 | Brown et al. | |
| 7,342,774 B2 | 3/2008 | Hossick-Schott et al. | |
| 7,410,509 B2 | 8/2008 | Eberhard et al. | |
| 7,515,396 B2 | 4/2009 | Biler | |
| 7,667,954 B2 | 2/2010 | Lessner et al. | |
| 7,718,736 B2 | 5/2010 | Park et al. | |
| 7,727,372 B2 | 6/2010 | Liu et al. | |
| 7,731,893 B2 | 6/2010 | Freeman et al. | |
| 7,837,743 B2 | 11/2010 | Gaffney et al. | |
| 7,879,217 B2 | 2/2011 | Goad et al. | |
| 7,929,274 B2 | 4/2011 | Reed et al. | |
| 7,952,853 B2 | 5/2011 | Viste et al. | |
| 8,023,250 B2 | 9/2011 | Ning et al. | |
| 8,259,435 B2 | 9/2012 | Millman et al. | |
| 8,279,585 B2 | 10/2012 | Dreissig et al. | |
| 8,288,005 B2 | 10/2012 | Manzara et al. | |
| 8,298,478 B2 | 10/2012 | Hintz et al. | |
| 8,313,621 B2 | 11/2012 | Goad et al. | |
| 8,405,956 B2 | 3/2013 | Dreissig et al. | |
| 8,451,586 B2 | 5/2013 | Priban | |
| 8,514,547 B2 | 8/2013 | Galvagni et al. | |
| 8,605,411 B2 | 12/2013 | Biler et al. | |
| 8,675,348 B2 | 3/2014 | Viste et al. | |
| 8,687,347 B2 | 4/2014 | Bates et al. | |
| 8,741,214 B2 | 6/2014 | Evans | |
| 2004/0243183 A1 | 12/2004 | Norton et al. | |
| 2006/0091020 A1 | 5/2006 | Hossick-Schott et al. | |
| 2006/0191796 A1 | 8/2006 | Muffoletto et al. | |
| 2007/0127190 A1* | 6/2007 | Take | H01G 2/08 361/517 |
| 2007/0146969 A1* | 6/2007 | Naito | H01G 9/012 361/523 |
| 2007/0221507 A1 | 9/2007 | Liu et al. | |
| 2008/0007894 A1 | 1/2008 | Seitz et al. | |
| 2008/0013257 A1 | 1/2008 | Seitz et al. | |
| 2008/0085451 A1 | 4/2008 | Freitag et al. | |
| 2009/0035652 A1 | 2/2009 | Freitag et al. | |
| 2009/0081552 A1 | 3/2009 | Shah et al. | |
| 2009/0117457 A1 | 5/2009 | Davis et al. | |
| 2010/0148128 A1 | 6/2010 | Shah et al. | |
| 2010/0155645 A1 | 6/2010 | Liu et al. | |
| 2010/0268292 A1 | 10/2010 | Eidelman et al. | |
| 2010/0318140 A1 | 12/2010 | Hintz et al. | |
| 2012/0069490 A1 | 3/2012 | Biler et al. | |
| 2012/0069491 A1 | 3/2012 | Biler | |
| 2012/0106030 A1* | 5/2012 | Millman | H01G 9/08 361/518 |
| 2012/0127632 A1 | 5/2012 | Evans et al. | |
| 2013/0141841 A1 | 6/2013 | Dreissig et al. | |
| 2013/0155580 A1 | 6/2013 | Karnik et al. | |
| 2013/0242464 A1 | 9/2013 | Biler et al. | |
| 2013/0242465 A1 | 9/2013 | Weaver et al. | |
| 2013/0242466 A1 | 9/2013 | Masheder et al. | |
| 2013/0242467 A1 | 9/2013 | Biler | |
| 2013/0242468 A1 | 9/2013 | Pinwill et al. | |

FOREIGN PATENT DOCUMENTS

| | | | |
|---|---|---|---|
| GB | 2 447 724 A | 9/2008 | |
| GB | 2 447 726 A | 9/2008 | |
| GB | 2 483 747 A | 3/2012 | |
| GB | 2 483 748 A | 3/2012 | |
| GB | 2 483 749 A | 3/2012 | |
| GB | 2 498 066 A | 7/2013 | |
| GB | 2 500 987 A | 10/2013 | |
| GB | 2 500 988 A | 10/2013 | |
| GB | 2 500 989 A | 10/2013 | |
| GB | 2 500 990 A | 10/2013 | |
| GB | 2 500 991 A | 10/2013 | |

OTHER PUBLICATIONS

GB Search Report for GB1403080.3 dated Jul. 23, 2014, 4 pages.
Related Application Form.

* cited by examiner

WET ELECTROLYTIC CAPACITOR FOR USE AT HIGH TEMPERATURES

RELATED APPLICATIONS

The present application claims priority to U.S. Provisional Application Ser. No. 61/788,263 (filed on Mar. 15, 2013) and which is incorporated herein in its entirety by reference thereto.

BACKGROUND OF THE INVENTION

Electrolytic capacitors typically have a larger capacitance per unit volume than certain other types of capacitors, making them valuable in relatively high-current and low-frequency electrical circuits. One type of capacitor that has been developed is a "wet" electrolytic capacitor that includes a sintered tantalum powder anode. These tantalum "slugs" have very large internal surface area. These tantalum slugs first undergo an electrochemical oxidation that forms an oxide layer coating acting as dielectric over the entire external and internal surfaces of the tantalum body. The anodized tantalum slugs are then sealed in cans containing a highly conductive and generally corrosive liquid electrolyte solution, having high surface area with conductive linings allowing the flow of the current to the liquid electrolyte solution. Unfortunately, such wet capacitors can experience problems when the liquid electrolyte leaks. For example, gases (e.g., hydrogen) may be evolved during operation, causing pressure to build inside the capacitor. This may cause leaks to occur around conventional non-hermetic polymeric seals, where terminal wires protrude from the capacitor casing.

In light of the above, a gas-tight hermetic seal (e.g., glass-to-metal seal) is often employed through which the terminal wire can safely extend. Still, the hermetic seal itself can sometimes become corroded by the liquid electrolyte. For this reason, a liquid seal is also generally employed to prevent exposure of the inner region of the hermetic seal to the electrolyte. U.S. Pat. No. 7,206,186 to Knight, et al., for instance, describes a liquid seal that is formed by compressing elastomeric rings between the underside of the lid and a terminal plate connected to the capacitor element. A bushing may also be positioned inside the elastomeric rings to center the rings relative to the hermetic seal. Despite attempts at improving the liquid sealing of such electrolytic capacitors, problems nevertheless remain. For example, even when liquid seals are used, the present inventors have discovered that such capacitors still tend to exhibit poor equivalent series resistance ("ESR") stability in high temperature environments associated with many commercial applications.

As such, a need still exists for an improved sealed wet electrolytic capacitor.

SUMMARY OF THE INVENTION

In accordance with one embodiment of the present invention, a wet electrolytic capacitor is disclosed that comprises a casing that defines an opening and a sidewall surrounding an interior, wherein the casing contains a metal substrate coated with an electrochemically active material; an anode positioned within the interior of the casing, wherein the anode is formed from an anodically oxidized sintered porous body, the anode comprising an anode lead extending therefrom; and a fluid working electrolyte that is in electrical contact with the anode and the electrochemically active material. The wet electrolytic capacitor exhibits an equivalence series resistance of about 3,000 milliohms or less at a temperature of 200° C., measured with a 2-volt bias and 1-volt signal at a frequency of 120 Hz.

In accordance with another embodiment of the present invention, a wet electrolytic capacitor is disclosed that comprises a casing that defines an opening and a sidewall surrounding an interior, wherein the casing contains an anodically oxidized metal substrate having a dielectric layer with a thickness of from about 10 nanometers to about 500 nanometers, wherein the metal substrate is coated with an electrochemically active material; an anode positioned within the interior of the casing, wherein the anode is formed from an anodically oxidized sintered porous body, the anode comprising an anode lead extending therefrom; and a fluid working electrolyte that is in electrical contact with the anode and the electrochemically active material.

In accordance with yet another embodiment of the present invention, a wet electrolytic capacitor is disclosed that comprises a casing that defines an opening and a sidewall surrounding an interior, wherein the casing contains a metal substrate coated with an electrochemically active material; an anode positioned within the interior of the casing, wherein the anode is formed from an anodically oxidized sintered porous body, the anode comprising an anode lead extending therefrom; a fluid working electrolyte that is in electrical contact with the anode and the electrochemically active material; and a sealing assembly that covers the opening of the casing and includes a hermetic seal and a barrier seal, wherein the barrier seal contains an elastomeric material that exhibits an elongation at break of about 100% or more and/or a tensile strength at break of about 2 Megapascals or more at a temperature of 200° C., as determined in accordance with ASTM D412 at a tensile grip speed of 500 millimeters per minutes.

In accordance with still another embodiment of the present invention, a method for forming an electrolytic capacitor is disclosed. The method comprises forming a casing by anodically oxidizing a metal substrate to form a dielectric layer thereon having a thickness of from about 10 nanometers to about 500 nanometers, and thereafter coating the substrate with an electrochemically active material; positioning an anode within an interior of the casing, wherein the anode is formed from an anodically oxidized sintered porous body, the anode comprising an anode lead extending therefrom; and placing a fluid working electrolyte in electrical contact with the anode and the electrochemically active material.

Other features and aspects of the present invention are described in more detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a wet electrolytic capacitor that contains an anode formed from an anodically oxidized sintered porous body and a fluidic working electrolyte, which are positioned within a casing. The casing contains a metal substrate coated an electrochemically-active material. Through a unique and controlled combination of features relating to the capacitor configuration and sealing assembly, the present inventor has discovered that good electrical properties (e.g., ESR stability) can be achieved at relatively high temperatures. For instance, the capacitor of the present invention may exhibit an ESR of about 3,000 milliohms or less, in some embodiments less than about 2,000 milliohms, in some embodiments from about 1 to about 1,000 milliohms, and in some embodiments, from about 50 to about 800 milliohms, measured with a 2-volt bias and 1-volt signal at a frequency of 120 Hz. Notably, such low ESR values may be maintained even at high temperatures. For example, the values may be maintained at temperatures ranging from about 150° C. to about 400° C., in some embodiments from about 175° C. to about 350° C., and in some embodiments, from about 200° C. to about 300° C. (e.g., 200° C., 225° C., 250° C., 275° C., or 300° C.). The operating time that the values may be maintained are also relatively long, such as about 100 hours or more, in some embodiments from about 200 hours to about 3000 hours, and in some embodiments, from about 400 hours to about 2000 hours (e.g., 500 hours, 600 hours, 700 hours, 800 hours, 900 hours, 1000 hours, 1100 hours, 1200 hours, or 2000 hours).

One unique feature of the wet electrolytic capacitor that can help achieve such good ESR stability is the presence of a dielectric layer on the metal substrate of the cathode within a controlled thickness range. For example, the thickness may be from about 10 nanometers to about 500 nanometers, in some embodiments from about 15 nanometers to about 200 nanometers, in some embodiments from about 20 nanometers to about 100 nanometers, and some embodiments, from about 30 nanometers to about 80 nanometers. Within intending to be limited by theory, it is believed that acids often present in the working electrolyte can undergo secondary reactions with the metal substrate (e.g., tantalum) at relatively high temperatures. The presence of a relatively thick dielectric layer can therefore help to passivate the metal substrate, and thereby minimize the likelihood that the working electrolyte will react with the substrate to reduce its conductivity and increase ESR. By ensuring that the thickness is controlled within the ranges noted above, however, the present inventor has also discovered that the conductivity of the cathode is not reduced to such an extent that the electrical properties of the capacitor are adversely impacted.

Of course, other aspects of the capacitor may also be selected to help achieve the desired performance at high temperatures. In certain embodiments, for example, a sealing assembly may be employed that contains a hermetic seal (e.g., glass-to-metal seal) and an elastomeric barrier seal formed from a high-temperature elastomeric material. By selectively controlling the nature of the elastomeric material, the present inventor has discovered that the resulting barrier seal can maintain its elastomeric properties even at high temperatures. This provides the barrier seal with the ability to inhibit the leakage of vapors from the electrolyte from escaping the capacitor, which could otherwise lead to a rapid increase in ESR. The barrier seal may also have the residual benefit of limiting the vibration of the anode during use, which can enhance mechanical stability.

Various embodiments of the present invention will now be described in further detail.

I. Cathode

The cathode of the capacitor generally contains a metal substrate that is coated with an electrochemically active material. The metal substrate may be formed from a variety of different metals, such as tantalum, niobium, aluminum, nickel, hafnium, titanium, copper, silver, steel (e.g., stainless), alloys thereof, composites thereof (e.g., metal coated with electrically conductive oxide), and so forth. Tantalum is particularly suitable for use in the present invention. The geometric configuration of the substrate may generally vary as is well known to those skilled in the art, such as in the form of a foil, sheet, screen, container, can, etc. The metal substrate may form the all or a portion of casing for the capacitor, or it may simply be applied to the casing. Regardless, the substrate may have a variety of shapes, such as generally cylindrical, D-shaped, rectangular, triangular, prismatic, etc. If desired, a surface of the substrate may be roughened to increase its surface area and increase the degree to which a material may be able to adhere thereto. In one embodiment, for example, a surface of the substrate is chemically etched, such as by applying a solution of a corrosive substance (e.g., hydrochloric acid) to the surface. Mechanical roughening may also be employed. For instance, a surface of the substrate may be abrasive blasted by propelling a stream of abrasive media (e.g., sand) against at least a portion of a surface thereof.

Regardless of its nature, a surface of the metal substrate (e.g., interior surface) may be subjected to a voltage to initiate anodic formation ("anodization") of an oxide film (dielectric layer) as described above. For example, a tantalum (Ta) substrate may be anodized to form a dielectric layer of tantalum pentoxide ($Ta_2O_5$). Anodization may be performed by initially applying an electrolyte to the metal substrate, such as by dipping the substrate into a bath that contains the electrolyte, and then applying a current. The electrolyte is generally in the form of a liquid, such as a solution (e.g., aqueous or non-aqueous), dispersion, melt, etc. A solvent is generally employed in the electrolyte, such as water (e.g., deionized water); ethers (e.g., diethyl ether and tetrahydrofuran); alcohols (e.g., methanol, ethanol, n-propanol, isopropanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); and so forth. The solvent may constitute from about 50 wt. % to about 99.9 wt. %, in some embodiments from about 75 wt. % to about 99 wt. %, and in some embodiments, from about 80 wt. % to about 95 wt. % of the electrolyte. Although not necessarily required, the use of an aqueous solvent (e.g., water) is often desired to facilitate formation of an oxide. In fact, water may constitute about 1 wt. % or more, in some embodiments about 10 wt. % or more, in some embodiments about 50 wt. % or more, in some embodiments about 70 wt. % or more, and in some embodiments, about 90 wt. % to 100 wt. % of the solvent(s) used in the electrolyte.

The electrolyte is electrically conductive and may have an electrical conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the electrical conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, dodecylsulfonic acid, dodecylbenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. The concentration of ionic compounds is selected to achieve the desired electrical conductivity. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the electrolyte. If desired, blends of ionic compounds may also be employed in the electrolyte.

A current is passed through the electrolyte to form the dielectric layer. The value of voltage manages the charge (current multiplied by time) and thereby the thickness of the dielectric layer. For example, the power supply may be initially set up at a galvanostatic mode until the required voltage is reached. Thereafter, the power supply may be switched to a potentiostatic mode in which the voltage is held constant to ensure that the desired dielectric thickness is formed over the surface of the metal substrate. Of course, other known methods may also be employed, such as pulse methods. Regardless, to help achieve the desired thickness for the dielectric layer as noted above, the forming voltage used during anodization, which is typically equal to the peak voltage, is typically high, such as about 5 volts or more, in some embodiments about 7 volts or more, in some embodiments from about 10 volts to about 25 volts, and in some embodiments, from about 12 to about 22 volts. The voltage level may vary (e.g., increasing) or remain constant within this range. The temperature of the anodizing solution may range from about 10° C. to about 200° C., in some embodiments from about 20° C. to about 150° C., and in some embodiments, from about 30° C. to about 100° C. The resulting dielectric layer may thus be formed on the surface of the metal substrate as described above.

Once formed, an electrochemically-active material is applied to the anodically oxidized metal substrate to increase the effective surface area over which the electrolyte electrochemically communicates with the substrate. Such an increased effective surface area allows for the formation of capacitors with increased cathode capacitance for a given size and/or capacitors with a reduced size for a given capacitance. The nature of the electrochemically active material may vary. For example, a particulate material may be employed that includes conductive particles, such as those formed from ruthenium, iridium, nickel, rhodium, rhenium, cobalt, tungsten, manganese, tantalum, niobium, molybdenum, lead, titanium, platinum, palladium, and osmium, as well as combinations of these metals. Non-insulating oxide conductive particles may also be employed. Suitable oxides may include a metal selected from the group consisting of ruthenium, iridium, nickel, rhodium, rhenium, cobalt, tungsten, manganese, tantalum, niobium, molybdenum, lead, titanium, platinum, palladium, and osmium, as well as combinations of these metals. Particularly suitable metal oxides include ruthenium dioxide, niobium oxide, niobium dioxide, iridium oxide, and manganese dioxide. Carbonaceous particles may also be employed that have the desired level of conductivity, such as activated carbon, carbon black, graphite, etc. Some suitable forms of activated carbon and techniques for formation thereof are described in U.S. Pat. No. 5,726,118 to Ivey, et al. and U.S. Pat. No. 5,858,911 to Wellen, et al. Tantalum particles may be particularly suitable for use as the electrochemically-active material.

If desired, the electrochemically active particles (e.g., tantalum particles) may be sintered to form a porous, integral mass. For example, sintering may be conducted at a temperature of from about 800° C. to about 2000° C., in some embodiments from about 1200° C. to about 1800° C., and in some embodiments, from about 1500° C. to about 1700° C., for a time of from about 5 minutes to about 100 minutes, and in some embodiments, from about 10 minutes to about 50 minutes. This may occur in one or more steps. If desired, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

A conductive polymer coating may also be employed as the electrochemically active material. Such coatings may be particularly suitable in those embodiments in which the wire assembly is not used in the cathode. The conductive polymer coating may be formed from one or more layers. The material employed in such layer(s) may vary. In one embodiment, for example, the material includes conductive polymer(s) that are typically π-conjugated and have electrical conductivity after oxidation or reduction. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Substituted polythiophenes are particularly suitable for use as conductive polymer in that they have particularly good mechanical robustness and electrical performance. In one particular embodiment, the substituted polythiophene has the following general structure:

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

Methods for forming conductive polymers, such as described above, are well known in the art. For instance, U.S. Pat. No. 6,987,663 to Merker, et al. describes various techniques for forming substituted polythiophenes from a monomeric precursor. The monomeric precursor may, for instance, have the following structure:

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

wherein, $R_7$ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al. Derivatives of these monomers may also be employed that are, for example, dimers or timers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers may be chemically polymerized in the presence of an oxidative catalyst. The oxidative catalyst typically includes a transition metal cation, such as iron(III), copper(II), chromium(VI), cerium(IV), manganese(IV), manganese(VII), ruthenium(III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the substrate. Suitable application techniques may include screen-printing, dipping, electrophoretic coating, and spraying, may be used to form a conductive polymer coating. As an example, the monomer may initially be mixed with the oxidative catalyst to form a precursor solution. Once the mixture is formed, it may be applied to the substrate and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The substrate may then be dried to remove the solvent therefrom. Thereafter, the substrate may be dipped into a solution containing the monomer. Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al.

In addition to in situ application, a conductive polymer layer may also be applied in the form of a dispersion of conductive polymer particles. Although their size may vary, it is typically desired that the particles possess a small diameter to increase the surface area available for adhering to the substrate. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The total target thickness of the electrochemically active coating may generally vary depending on the desired properties of the capacitor. Typically, the coating has a thickness of from about 0.2 micrometers ("μm") to about 50 μm, in some embodiments from about 0.5 μm to about 20 μm, and in some embodiments, from about 1 μm to about 5 μm. Regardless, the resulting cathode, including the substrate, electrochemically active material, and optional wire assembly, may have a relatively small thickness. For example, the cathode may have a thickness ranging from about 50 micrometers to about 2000 micrometers, in some embodiments from about 100 micrometers to about 1500 micrometers, and in some embodiments, from about 200 micrometers to about 1000 micrometers.

II. Anode

The anode of the electrolytic capacitor includes a porous body that may be formed from a valve metal composition. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1, 0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H.C. Starck (e.g., NH175 nodular powder). The powder may be formed using techniques known to those skilled in the art. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). Any of a variety of milling techniques may be utilized in the present invention to achieve the desired particle characteristics. For example, the powder may be dispersed in a fluid medium (e.g., ethanol, methanol, fluorinated fluid, etc.) to form a slurry. The slurry may then be combined with a grinding media (e.g., metal balls, such as tantalum) in a mill. The number of grinding media may generally vary depending on the size of the mill, such as from about 100 to about 2000, and in some embodiments from about 600 to about 1000. The starting powder, the fluid medium, and grinding media may be combined in any proportion. For example, the ratio of the starting valve metal powder to the grinding media may be from about 1:5 to about 1:50. Likewise, the ratio of the volume of the fluid medium to the combined volume of the starting valve metal powder may be from about 0.5:1 to about 3:1, in some embodiments from about 0.5:1 to about 2:1, and in some embodiments, from about 0.5:1 to about 1:1. Some examples of mills that may be used in the present invention are described in U.S. Pat. Nos. 5,522,558; 5,232,169; 6,126,097; and 6,145,765.

Milling may occur for any predetermined amount of time needed to achieve the target specific surface area. For example, the milling time may range from about 30 minutes to about 40 hours, in some embodiments, from about 1 hour to about 20 hours, and in some embodiments, from about 5 hours to about 15 hours. Milling may be conducted at any desired temperature, including at room temperature or an elevated temperature. After milling, the fluid medium may be separated or removed from the powder, such as by air-drying, heating, filtering, evaporating, etc. For instance, the powder may optionally be subjected to one or more acid leaching steps to remove metallic impurities. Such acid leaching steps are well known in the art and may employ any of a variety of acids, such as mineral acids (e.g., hydrochloric acid, hydrobromic acid, hydrofluoric acid, phosphoric acid, sulfuric acid, nitric acid, etc.), organic acids (e.g., citric acid, tartaric acid, formic acid, oxalic acid, benzoic acid, malonic acid, succinic acid, adipic acid, phthalic acid, etc.); and so forth.

Although not required, the powder may be agglomerated using any technique known in the art. Such powders may be agglomerated in a variety of ways, such as through one or multiple heat treatment steps at a temperature of from about 700° C. to about 1400° C., in some embodiments from about 750° C. to about 1200° C., and in some embodiments, from about 800° C. to about 1100° C. Heat treatment may occur in an inert or reducing atmosphere. For example, heat treatment may occur in an atmosphere containing hydrogen or a hydrogen-releasing compound (e.g., ammonium chloride, calcium hydride, magnesium hydride, etc.) to partially sinter the powder and decrease the content of impurities (e.g., fluorine). If desired, agglomeration may also be performed in the presence of a getter material, such as magnesium. After thermal treatment, the particles may be passivated by the gradual admission of air. Other suitable agglomeration techniques are also described in U.S. Pat. No. 6,576,038 to Rao; U.S. Pat. No. 6,238,456 to Wolf, et al.; U.S. Pat. No. 5,954,856 to Pathare, et al.; U.S. Pat. No. 5,082,491 to Rerat; U.S. Pat. No. 4,555,268 to Getz; U.S. Pat. No. 4,483,819 to Albrecht, et al.; U.S. Pat. No. 4,441,927 to Getz, et al.; and U.S. Pat. No. 4,017,302 to Bates, et al.

Certain additional components may also be included in the powder. For example, the powder may be optionally mixed with a binder and/or lubricant to ensure that the particles adequately adhere to each other when pressed. Suitable binders may include, for instance, poly(vinyl butyral); poly(vinyl acetate); poly(vinyl alcohol); poly(vinyl pyrrolidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax™ from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may be compacted using any conventional powder press mold. For example, the press mold may be a single station compaction press using a die and one or multiple punches. Alternatively, anvil-type compaction press molds may be used that use only a die and single lower punch, Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body.

If desired, any binder/lubricant may be removed after compression, such as by heating the formed pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Regardless, the pressed anode body is sintered to form a porous, integral mass. The sintering conditions may be within the ranges noted above.

The sintered anode body may then be anodically oxidized ("anodized") so that a dielectric layer is formed over and/or within the anode. Anodization may be performed using electrolyte solutions such as those described above. Typically, the voltage at which anodic oxidation of the anode occurs ranges from about 4 to about 250 V, and in some embodiments, from about 9 to about 200 V, and in some embodiments, from about 20 to about 150 V. The resulting dielectric layer may be formed on a surface of the anode and within its pores.

The size of the resulting anode may depend in part on the desired size of the capacitor. In certain embodiments, the length of the anode body may range from about 1 to about 100 millimeters, in some embodiments from about 5 to about 60 millimeters, and in some embodiments, from about 5 to about 20 millimeters. The width (or diameter) of the anode may also range from about 0.5 to about 20 millimeters, in some embodiments from about 1 to about 20 millimeters, and in some embodiments, from about 4 to about 10 millimeters. The shape of the anode may also be selected to improve the electrical properties of the resulting capacitor. For example, the anode body may have a shape that is cylindrical, rectangular, D-shaped, curved, etc.

III. Working Electrolyte

The working electrolyte is a fluid that may be impregnated within the anode, or it may be added to the capacitor at a later stage of production. The fluid electrolyte generally uniformly wets the dielectric on the anode. Various suitable electrolytes are described in U.S. Pat. Nos. 5,369,547 and 6,594,140 to Evans, et al. Typically, the electrolyte is ionically conductive in that has an electrical conductivity of from about 0.1 to about 20 Siemens per centimeter ("S/cm"), in some embodiments from about 0.2 to about 15 S/cm, and in some embodiments, from about 0.5 to about 10 S/cm, determined at a temperature of about 23° C. using any known electric conductivity meter (e.g., Oakton Con Series 11). The fluid electrolyte is generally in the form of a liquid, such as a solution (e.g., aqueous or non-aqueous), colloidal suspension, gel, etc. For example, the electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($K^+$), and lithium ($Li^+$) are particularly suitable cations for use in the present invention. The organic acid used to form the anion of the salt may be "weak" in the sense that it typically has a first acid dissociation constant ($pK_{a1}$) of about 0 to about 11, in some embodiments about 1 to about 10, and in some embodiments, from about 2 to about 10, determined at about 23° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, mesotartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethyicaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent(s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments from about 15 wt. % to about 35 wt. % of the electrolyte.

If desired, the electrolyte may be relatively neutral and have a pH of from about 4.5 to about 8.0, in some embodiments from about 5.0 to about 7.5, and in some embodiments, from about 5.5 to about 7.0. One or more pH adjusters (e.g., acids, bases, etc.) may be employed to help achieve the desired pH. In one embodiment, an acid is employed to lower the pH to the desired range. Suitable acids include, for instance, organic acids such as described above; inorganic acids, such as hydrochloric acid, nitric acid, sulfuric acid, phosphoric acid, polyphosphoric acid, boric acid, boronic acid, etc.; and mixtures thereof. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc.). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

IV. Sealing Assembly

The anode and working electrolyte of the capacitor are generally positioned within the interior of a casing, which defines an opening that is closed by a sealing assembly. The sealing assembly includes, for instance, a hermetic seal that is generally formed from an insulative material, such as glass. If desired, a conductive tube may be employed that has an orifice of a size and shape sufficient to accommodate the anode lead. The conductive tube is typically formed from a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. In such embodiments, the conductive tube may pass through a bore within the hermetic seal so that it is electrically insulated.

The sealing assembly may also include an elastomeric barrier seal that is in contact with at least a portion of the hermetic seal, such as its lower surface. In certain embodiments, the elastomeric barrier seal may be formed from a material that does not substantially degrade or lose its mechanical properties at relatively high temperatures, such as those ranging from about 150° C. to about 400° C., in some embodiments from about 175° C. to about 350° C., and in some embodiments, from about 200° C. to about 300° C. (e.g., at 200° C., 225° C., 250° C., 275° C., or 300° C.). For example, such a high-temperature elastomeric material may exhibit an "elongation at break" of about 100% or more, in some embodiments about 125% or more, and in some embodiments, from about 140% to about 250%, and/or a "tensile strength at break" of about 2 Megapascals ("MPa") or more, in some embodiments about 5 MPa or more, and in some embodiments, from about 10 MPa to about 25 MPa, such properties being determined in accordance with ASTM D412 at a tensile grip speed of 500 millimeters per minutes. Notably, the mechanical properties may be maintained over a wide variety of temperature ranges, including the high temperatures noted above, which allows the seal to remain functional as a liquid and/or vapor barrier under extreme conditions.

Although various materials may achieve the properties noted above, the present inventor has discovered that perfluoroelastomers are particularly effective in that they can exhibit the desired high temperature performance and also a high degree of corrosion resistance to the working electrolyte.

Examples of perfluoroelastomers are described, for instance, in U.S. Pat. No. 4,281,092 to Breazeale; U.S. Pat. No. 5,788,216 to Pittman, et al.; and U.S. Pat. No. 7,718,736 to Park, et al. Particularly suitable perfluoroelastomers for use in the present invention include those that are in the form of a crosslinked copolymer derived primarily or entirely from fluorinated monomer units, such as tetrafluoroethylene and perfluoro(methyl vinyl ether) monomer units. Such copolymers may also contain an additional monomer to facilitate crosslinking, such as $CF_2=CF-O-CF_2-CF(CF_3)-O-C_6F_5$, $CH_2=CH-CF_2-CF_2Br$, $CF_2=CF-O-CF_2CF(CF_3)OCF_2CF_2CN$, and $CF_2=CH_2$. Such perfluoroelastomers are available from DuPont under the trade designation Kalrez®. Yet other suitable perfluoroelastomers may include copolymers of tetrafluoroethylene and a mixture of perfluoromethylvinyl ether and higher molecular vinyl ether, and having a cure site monomer derived from perfluoro alkyl diodide.

Figure 1:
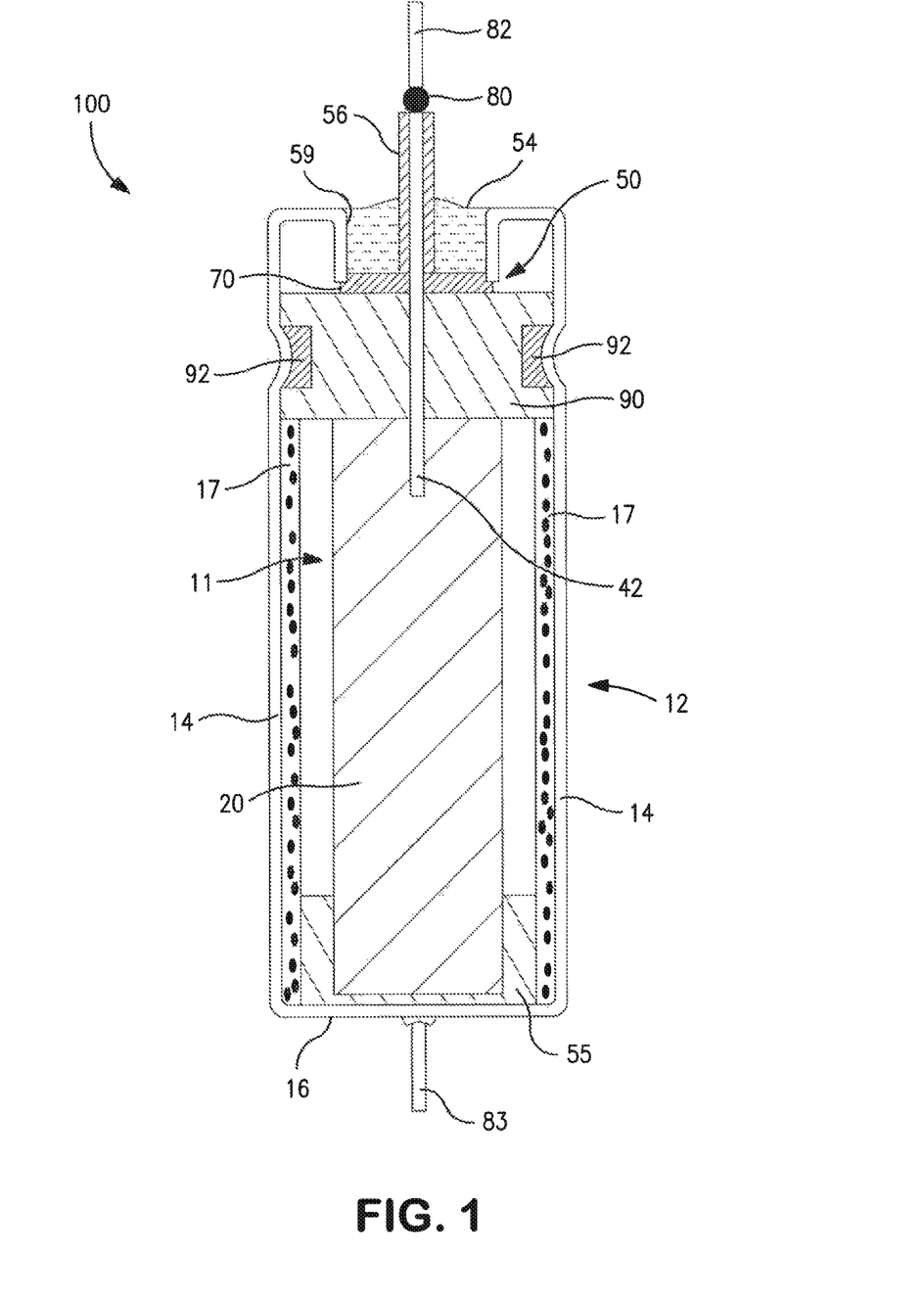
FIG. 1 is a schematic view of one embodiment of the wet electrolytic capacitor of the present invention.

The arrangement of the sealing assembly within a capacitor is not critical and may vary as would be appreciated by those skilled in the art. Referring to FIG. 1, for example, one particular embodiment of a capacitor 100 is shown. As shown, the capacitor 100 contains a casing 12 having a sidewall 14 and a lower wall 16. Multiple sidewalls may be employed in such embodiments where the casing is not cylindrical. An electrochemically-active cathode material 17 (e.g., sintered tantalum) is also applied to at least a portion of the casing 12 as discussed above. For example, the electrochemically active material may be disposed on the inner surfaces of the sidewall 14 and the lower wall 16. An anode 20 is also positioned within an interior 11 of the casing 12. An anode lead 42 may extend from the anode 20 in a longitudinal direction through a conductive tube 56.

The capacitor 100 also contains a sealing assembly 50. In this particular embodiment, the sealing assembly covers an opening 59 defined between crimped portions of the casing 12. Alternatively, however, a lid may be provided as is known in the art that defines the opening. In any event, a hermetic seal 54 (e.g., glass-to-metal seal) is positioned within the opening 59 in the illustrated embodiment that defines a bore through which the conductive tube 56 and the anode lead 42 can pass. The sealing assembly 50 also includes a barrier seal 70 formed from a high-temperature elastomeric material as described above. The seal 70 may have a generally cylindrical shape and contain a bore coaxially located therein through which the conductive tube 56 and the anode lead 42 can pass. In this manner, the barrier seal 70 can cover at least a portion of the lower surface of the hermetic seal 54 to limit its contact with any electrolyte. If desired, the barrier seal 70 may cover a substantial portion of the lower surface of the hermetic seal 54. By "substantial portion", it is generally meant that the seal covers about 80% or more of the surface, in some embodiments about 90% or more of the surface, and in some embodiments, about 100% of the surface. As shown in FIG. 1, the barrier seal 70 also typically covers at least a portion of the conductive tube 56.

Figure 2:
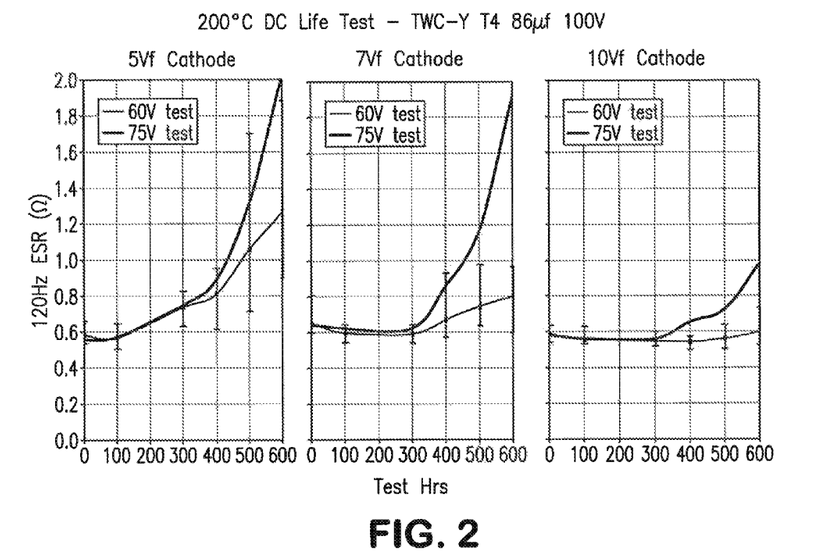
FIG. 2 are graphical results showing ESR (ohms) at 200° C. versus time (hours) for the capacitors of Example 1.

In addition to the sealing assembly discussed above, the capacitor of the present invention may also contain one or more secondary seals. For example, additional gaskets or bobbin may be employed that are formed from non-elastomeric insulative materials, such as polytetrafluoroethylene ("PTFE"). In one embodiment, for example, a bobbin 90 may be positioned between the anode 20 and the barrier seal 70. Elastomeric rings 92 may also be employed, such as adjacent to the sidewall 14 of the casing 12. The elastomeric rings 92 may be formed from a high-temperature elastomer, such as described above, or from another type of elastomeric material. Also, if desired, a support may be provided in contact with the anode to help ensure that it remains mechanically stable during use. The support may be from an insulative material, such as polytetrafluoroethylene ("PTFE"). One example of such a support is shown in FIG. 2 as element 55, which is positioned adjacent to and in contact with the lower surface of the anode 20. An external positive lead 82 may likewise be connected to the anode lead 42 at an end of the conductive tube 56 via a weld joint 80 and external negative lead 83 may be connected to the lower wall 16 of the casing 12.

Regardless of the particular configuration, the resulting capacitor of the present invention may exhibit excellent electrical properties. Regardless of its particular configuration, the capacitor of the present invention may exhibit excellent electrical properties. For example, the capacitor may exhibit a high volumetric efficiency, such as from about 50,000 $\mu F*V/cm^3$ to about 300,000 $\mu F*V/cm^3$, in some embodiments from about 60,000 $\mu F*V/cm^3$ to about 200,000 $\mu F*V/cm^3$, and in some embodiments, from about 80,000 $\mu F*V/cm^3$ to about 150,000 $\mu F*V/cm^3$, determined at a frequency of 120 Hz and at room temperature (e.g., 25° C.). Volumetric efficiency is determined by multiplying the formation voltage of a part by its capacitance, and then dividing the product by the volume of the part. For example, a formation voltage may be 175 volts for a part having a capacitance of 520 $\mu F$, which results in a product of 91,000 $\mu F*V$. If the part occupies a volume of about 0.8 $cm^3$, this results in a volumetric efficiency of about 113,750 $\mu F*V/cm^3$.

The capacitor may also exhibit a high energy density that enables it suitable for use in high pulse applications. Energy density is generally determined according to the equation $E=\frac{1}{2}*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at operating frequencies of from 10 to 120 Hz (e.g., 120 Hz) and a temperature of 25° C. For example, the capacitor may exhibit an energy density of about 2.0 joules per cubic centimeter ($J/cm^3$) or more, in some embodiments about 3.0 $J/cm^3$, in some embodiments from about 3.5 $J/cm^3$ to about 10.0 $J/cm^3$, and in some embodiments, from about 4.0 to about 8.0 $J/cm^3$. The capacitance may likewise be about 1 milliFarad per square centimeter ("$mF/cm^2$") or more, in some embodiments about 2 $mF/cm^2$ or more, in some embodiments from about 5 to about 50 $mF/cm^2$, and in some embodiments, from about 8 to about 20 $mF/cm^2$. The capacitor may also exhibit a relatively high "breakdown voltage" (voltage at which the capacitor fails), such as about 180 volts or more, in some embodiments about 200 volts or more, and in some embodiments, from about 210 volts to about 260 volts. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 1 $\mu A/\mu F*V$, in some embodiments less than about 0.5 $\mu A/\mu F*V$, and in some embodiments, less than about 0.1 $\mu A/\mu F*V$, where $\mu A$ is microamps and $\mu F*V$ is the product of the capacitance and the rated voltage. Leakage current may be measured using a leakage test meter (e.g., MC 190 Leakage test, Mantracourt Electronics LTD, UK) at a temperature of 25° C. and at a certain rated voltage after a charging time of from about 60 to about 300 seconds. Such normalized leakage current values may even be maintained for a substantial amount of time at high temperatures, such as described above.

The electrolytic capacitor of the present invention may be used in various applications, including but not limited to micro-inverters; micro-UPS devices; medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 volts and approximately 850 volts, or, desirably, between approximately 600 Volts and approximately 900 volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device may also contain a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following example.

EXAMPLE 1

86 μF/100V samples were assembled as described herein with an anodically oxidized tantalum anode, a cathode that contains a sintered tantalum coating on the interior surface of a cylindrical tantalum can, and a sulfuric acid working electrolyte. Prior to applying the sintered tantalum coating, the interior surface of the tantalum can was anodized at formation voltages of 5, 7, and 10 V. The resulting capacitors were tested at 200° C. for ESR under applied voltages of 60V and 75V. The results are shown in FIG. 2, As shown, the 5 Vf cathode yielded a 117% increase in ESR after 600Hrs, compared to only a 23% increase for the 7 Vf cathode and only a 2.4% increase for the 10 Vf cathode. Capacitors tested under an excessive voltage condition of 75 V yielded a 262% increase in ESR after 600Hrs, compared to 197% for the 7 Vf cathode and 100% for the 10 Vf cathode.

EXAMPLE 2

Figure 3:
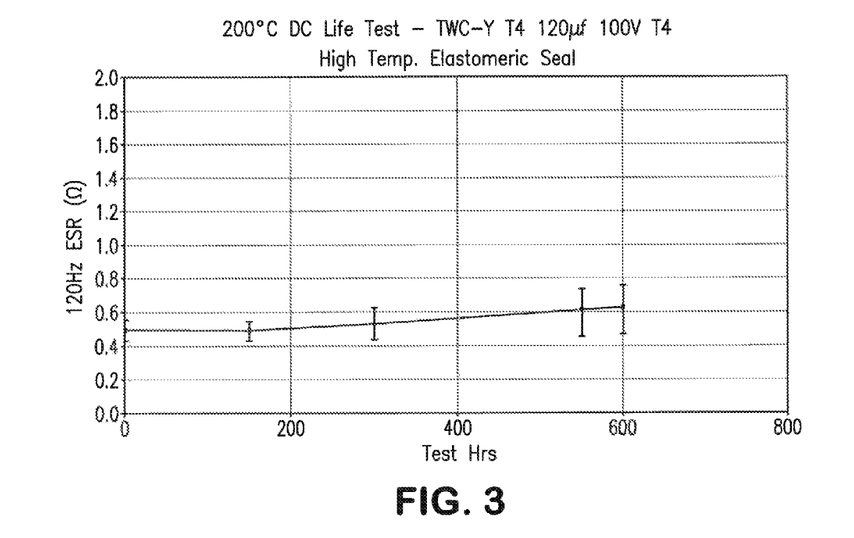
FIG. 3 is the graphical result showing ESR (ohms) at 200° C. versus time (hours) for the capacitors of Example 2.

120 μF/100V samples were assembled as described herein with an anodically oxidized tantalum anode, a cathode that contains a sintered tantalum coating on the interior surface of a cylindrical tantalum can, and a sulfuric acid working electrolyte. The samples contained an elastomeric barrier seal as described herein. The resulting capacitors were tested at 200° C. for ESR under an applied voltage of 60V. The results are shown in FIG. 3. As shown, the capacitors yielded an increase of only 27% after 600 hours.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
    a casing that defines an opening and a sidewall surrounding an interior, wherein the casing contains an anodically oxidized metal substrate having a dielectric layer with a thickness of from about 10 nanometers to about 500 nanometers, wherein the metal substrate is coated with an electrochemically active material;
    an anode positioned within the interior of the casing, wherein the anode is formed from an anodically oxidized sintered porous body, the anode comprising an anode lead extending therefrom; and
    a fluid working electrolyte that is in electrical contact with the anode and the electrochemically active material.

2. The wet electrolytic capacitor of claim 1, further comprising a sealing assembly that covers the opening and includes a hermetic seal and a barrier seal, wherein the barrier seal contains an elastomeric material.

3. The wet electrolytic capacitor of claim 2, wherein the elastomeric material includes a perfluoroelastomer.

4. The wet electrolytic capacitor of claim 2, wherein the elastomeric material exhibits an elongation at break of about 100% or more and/or a tensile strength at break of about 2 Megapascals or more at a temperature of 200° C., as determined in accordance with ASTM D412 at a tensile grip speed of 500 millimeters per minutes.

5. The wet electrolytic capacitor of claim 1, wherein the thickness of the dielectric layer is from about 20 to about 100 nanometers.

6. The wet electrolytic capacitor of claim 1, wherein the metal substrate is formed from tantalum.

7. The wet electrolytic capacitor of claim 1, wherein the metal substrate forms all or a part of the casing.

8. The wet electrolytic capacitor of claim 1, wherein the electrochemically active material includes sintered tantalum particles, conductive polymer, or a combination thereof.

9. The wet electrolytic capacitor of claim 1, wherein the anode includes tantalum.

10. The wet electrolytic capacitor of claim 2, further comprising a conductive tube that extends through the hermetic seal and/or the barrier seal, wherein the anode lead extends through the conductive tube.

11. The wet electrolytic capacitor of claim 10, further comprising an external positive lead that is sealed at an end of the conductive tube and an external negative lead that is sealed to a lower wall of the casing.

12. The wet electrolytic capacitor of claim 2, wherein the barrier seal is in contact with the hermetic seal.

13. The wet electrolytic capacitor of claim 12, wherein the barrier seal covers a substantial portion of a surface of the hermetic seal.

14. The wet electrolytic capacitor of claim 1, wherein the metal substrate is anodically oxidized by placing the substrate in an electrolyte bath and passing a current therethrough.

15. The wet electrolytic capacitor of claim 14, wherein the current is applied at a forming voltage of from about 7 volts to about 25 volts.

16. The wet electrolytic capacitor of claim 14, wherein the current is applied at a voltage of from about 12 to about 22 volts.

17. The wet electrolytic capacitor of claim 1, wherein the wet electrolytic capacitor exhibits an equivalence series resistance of about 3,000 milliohms or less at a temperature of 200° C., measured with a 2-volt bias and 1-volt signal at a frequency of 120 Hz.

18. The wet electrolytic capacitor of claim 1, wherein the thickness of the dielectric layer is from about 30 nanometers to about 80 nanometers.

\* \* \* \* \*